(12) United States Patent
Karich et al.

(10) Patent No.: US 11,846,333 B2
(45) Date of Patent: Dec. 19, 2023

(54) RADIAL MOUNTING TORQUE PLATE FOR HEAVY-DUTY VEHICLES

(71) Applicant: Hendrickson USA, L.L.C., Schaumburg, IL (US)

(72) Inventors: Matthew P. Karich, Fairlawn, OH (US); Jeffrey R. Wittlinger, Uniontown, OH (US); Jay D. White, North Canton, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 205 days.

(21) Appl. No.: 17/494,921

(22) Filed: Oct. 6, 2021

(65) Prior Publication Data
US 2022/0154788 A1 May 19, 2022

Related U.S. Application Data

(60) Provisional application No. 63/113,362, filed on Nov. 13, 2020.

(51) Int. Cl.
| | | |
|---|---|---|
| *F16D 65/00* | (2006.01) | |
| *F16D 55/227* | (2006.01) | |
| *F16D 65/12* | (2006.01) | |
| *F16D 65/02* | (2006.01) | |

(52) U.S. Cl.
CPC ....... *F16D 65/0056* (2013.01); *F16D 55/227* (2013.01); *F16D 65/123* (2013.01); *F16D 2065/1388* (2013.01); *F16D 2065/1392* (2013.01)

(58) Field of Classification Search
CPC ........... F16D 2055/0008; F16D 55/227; F16D 55/226; F16D 65/0056; F16D 65/123; F16D 2065/1388; F16D 2065/1392
See application file for complete search history.

(56) References Cited

U.S. PATENT DOCUMENTS

| | | | |
|---|---|---|---|
| 6,068,091 A | 5/2000 | Finley | |
| 6,250,439 B1 | 6/2001 | Matsuzaki | |
| 6,926,122 B2 | 8/2005 | Wittlinger et al. | |
| 7,708,124 B1 | 5/2010 | Rackers et al. | |
| 8,307,958 B2 | 11/2012 | Drewes | |
| 8,371,422 B2 | 2/2013 | Frost et al. | |
| 9,879,738 B2 | 1/2018 | White et al. | |
| 10,231,928 B2 * | 3/2019 | Bowyer | A61K 38/14 |
| 10,436,266 B2 * | 10/2019 | Hester | B60B 35/006 |
| 2012/0247885 A1 * | 10/2012 | Lantz | F16D 65/00 83/13 |

(Continued)

FOREIGN PATENT DOCUMENTS

DE 20021587 4/2001

*Primary Examiner* — Robert A. Siconolfi
*Assistant Examiner* — Mahbubur Rashid
(74) *Attorney, Agent, or Firm* — Dureska & Moore, LLC; David P. Dureska; Benjamin J. Chojnacki

(57) ABSTRACT

A radial mounting torque plate for mounting a disk brake component for heavy-duty vehicles, the torque plate comprising an annular portion and a pair of mounting arms. The annular portion is formed with an opening for receiving an axle of the heavy-duty vehicle. The mounting arms are integrally formed with and extend longitudinally outward in opposite directions from the annular portion and have a T-shaped cross-section.

25 Claims, 12 Drawing Sheets

(56) References Cited

U.S. PATENT DOCUMENTS

2016/0076610 A1* 3/2016 White ................. F16D 65/0062
                                                      188/73.39
2017/0259800 A1   9/2017 Fulton et al.
2018/0209496 A1* 7/2018 Hester ............... B60C 23/00354

* cited by examiner

RADIAL MOUNTING TORQUE PLATE FOR HEAVY-DUTY VEHICLES

CROSS-REFERENCE TO RELATED APPLICATION

This application claims the benefit of U.S. Provisional Patent Application No. 63/113,362, filed Nov. 13, 2020.

BACKGROUND OF THE INVENTION

Field of the Invention

The present invention relates generally to the art of braking systems for heavy-duty vehicles. In particular, the present invention relates to braking systems for heavy-duty vehicles that utilize disc brakes. More particularly, the present invention is directed to a radial mounting torque plate for heavy-duty vehicle disc brake systems, wherein the torque plate provides greater accessibility to components of the disc brake system facilitates installation and maintenance of the disc brake system while maintaining or reducing weight, reducing the cost of materials and manufacturing, and maintaining or increasing strength and durability of the torque plate.

Background Art

The use of braking systems on heavy-duty vehicles is well known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include drum brake systems and disc brake systems.

Disc brake systems are generally incorporated into an axle/suspension system of the heavy-duty vehicle. More specifically, disc brake systems include a plurality of disc brake assemblies, each operatively mounted on or adjacent a respective wheel end assembly of the heavy-duty vehicle. Each wheel end assembly, in turn, is rotatably mounted on a respective spindle fixedly connected to an end of an axle of the heavy-duty vehicle, as is known. A pair of suspension assemblies connects the axle to members of a frame or subframe of the heavy-duty vehicle, forming the axle/suspension system. For those heavy-duty vehicles that support a subframe, the subframe can be non-movable or movable, the latter being commonly referred to as a slider box, slider subframe, slider undercarriage, secondary slider frame, or bogey.

Each disc brake assembly typically includes a carrier, a caliper, and a rotor. The carrier is attached to and supported by a prior art torque plate, which is, in turn, mounted on and attached to the axle, by mechanical fasteners, as is known. The caliper is formed with a bore for receiving an actuator and a piston or multiple pistons. The actuator typically has an air chamber, referred to in the art as a brake chamber, that is in fluid communication with a compressed air source and activates movement of the piston. The caliper also includes a pad seat that is disposed outboardly of and opposite the piston. The caliper typically holds a pair of opposing brake pads that have friction material mounted to a backing plate. More specifically, each one of the brake pads is seated in the carrier such that one of the brake pads is adjacent the piston and the other brake pad is adjacent the outboard pad seat. The brake pads are seated such that the friction material of each brake pad is in opposition. The piston and the outboard pad seat cooperate to control movement of the brake pads during operation of the heavy-duty vehicle.

The rotor of each disc brake assembly is mounted to the respective wheel end assembly of the heavy-duty vehicle for rotation. The rotor extends radially outward from the wheel end assembly and is disposed between the opposing brake pads to allow the friction material of each pad to face a respective surface of the rotor.

During operation of the heavy-duty vehicle, when the vehicle braking system is engaged, compressed air flows to the brake chamber causing movement of the piston and the outboard pad seat, thereby forcing the brake pads toward one another. The friction material of the brake pads contacts the disc portion of the rotor, thereby slowing and/or stopping the heavy-duty vehicle.

The prior art torque plate resists the torque generated during braking and maintains proper alignment of the carrier, caliper, and rotor to ensure optimal operation of the components of the disc brake assembly. In particular, the prior art torque plate is rigidly connected to the axle of the axle/suspension system, such as by welding, adjacent the wheel end assembly of the heavy-duty vehicle. More particularly, the carrier is bolted to the torque plate allowing the carrier to hold the caliper square to the rotor, facilitating efficient braking. In the event that the caliper, brake pads, and/or other brake system components are not mounted and maintained in proper alignment, issues with the components can potentially occur. For example, uneven brake pad wear, binding of components, and cracking of the rotor or caliper may potentially occur and/or impair operation of the disc brake system.

Prior art torque plates, while adequate for the intended purpose, have potential disadvantages, drawbacks, and limitations. For example, prior art axial mounting torque plates typically utilize an axially mounted carrier and axially inserted fasteners to secure the carrier to the prior art torque plate. However, due to packaging restrictions of the heavy-duty vehicle, the axially mounted fasteners are difficult to access and manipulate. As a result, service and repair of disc brake systems utilizing prior art axial mounting torque plates are relatively more difficult, thereby increasing the amount of maintenance time and cost.

Prior art radial mounting torque plates have been developed to facilitate easier and faster maintenance and replacement of disc brake system components. However, prior art radial mounting torque plates typically require different structural geometry to accommodate the different fastener patterns of drive axles. More specifically, prior art radial mounting torque plates generally utilize a flange to attach the torque plate to the axle. Use of such flanges requires prior art radial mounting torque plates with relatively longer longitudinal mounting arms that prevent interference with the flanges. These relatively longer longitudinal mounting arms, in turn, require additional support to react forces generated during braking. As a result, prior art radial mounting torque plates are typically complicated, cast or forged structures that have an increased weight as compared to prior art axial mounting torque plates, increasing the cost of materials and manufacturing and decreasing the amount of cargo the heavy-duty vehicle can carry.

Thus, there is a need in the art for an improved radial mounting torque plate that facilitates maintenance and repair of the disc brake system and has a relatively comparable or reduced weight compared to prior art axial mounting torque plates, reducing the cost of materials and manufacturing, while increasing or maintaining strength and durability of the torque plate.

SUMMARY OF THE INVENTION

Objectives of the present invention include providing a radial mounting torque plate that facilitates maintenance and repair of components of a disk brake system.

A further objective of the present invention is to provide a radial mounting torque plate having comparable or reduced weight compared to prior art axial mounting torque plates.

Yet another objective of the present invention is to provide a radial mounting torque plate with increased or strength and durability.

Still another objective of the present invention is to provide a radial mounting torque plate having a reduced cost of materials and manufacturing.

These objectives and advantages are obtained by the radial mounting torque plate of the present invention, the torque plate comprising an annular portion and a pair of mounting arms. The annular portion is formed with an opening for receiving an axle of the heavy-duty vehicle. The mounting arms are integrally formed with and extend longitudinally outward in opposite directions from the annular portion and have a T-shaped cross-section.

BRIEF DESCRIPTION OF THE SEVERAL VIEWS OF THE DRAWINGS

The exemplary embodiment of the present invention, illustrative of the best mode in which applicants have contemplated applying the principles, is set forth in the following description, shown in the drawings, and particularly and distinctly pointed out and set forth in the appended claims.

Similar characters refer to similar parts throughout.

DESCRIPTION OF THE PREFERRED EMBODIMENT

Figure 1:
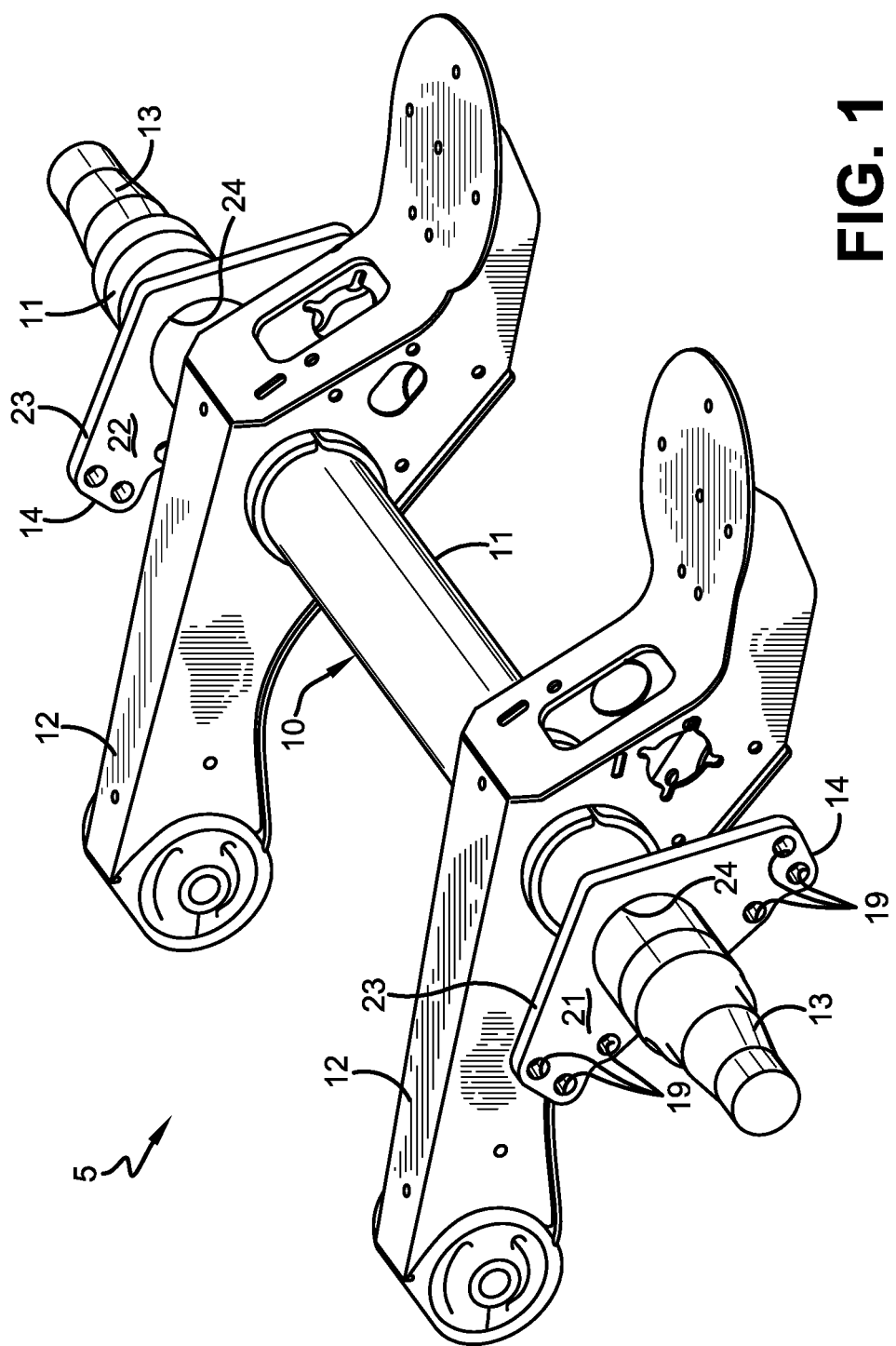
FIG. 1 is a driver side perspective view of a prior art torque plate incorporated into a heavy-duty vehicle axle/suspension system.
Figure 2:
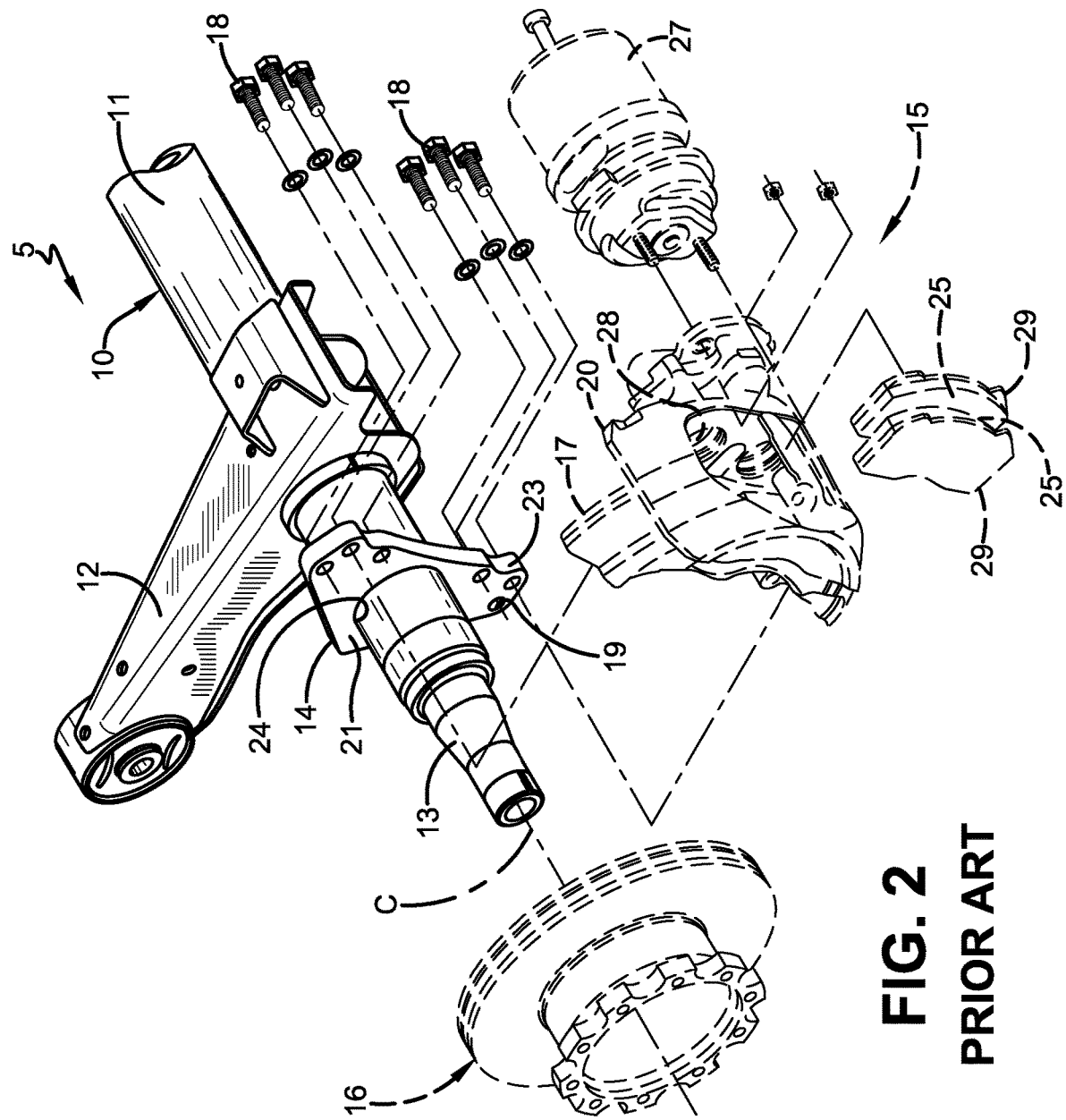
FIG. 2 is a partially-exploded fragmentary driver side perspective view of a portion of the axle/suspension system shown in FIG. 1, showing the prior art torque plate mounted to the axle and showing components of a disc brake assembly in phantom lines.
Figure 3:
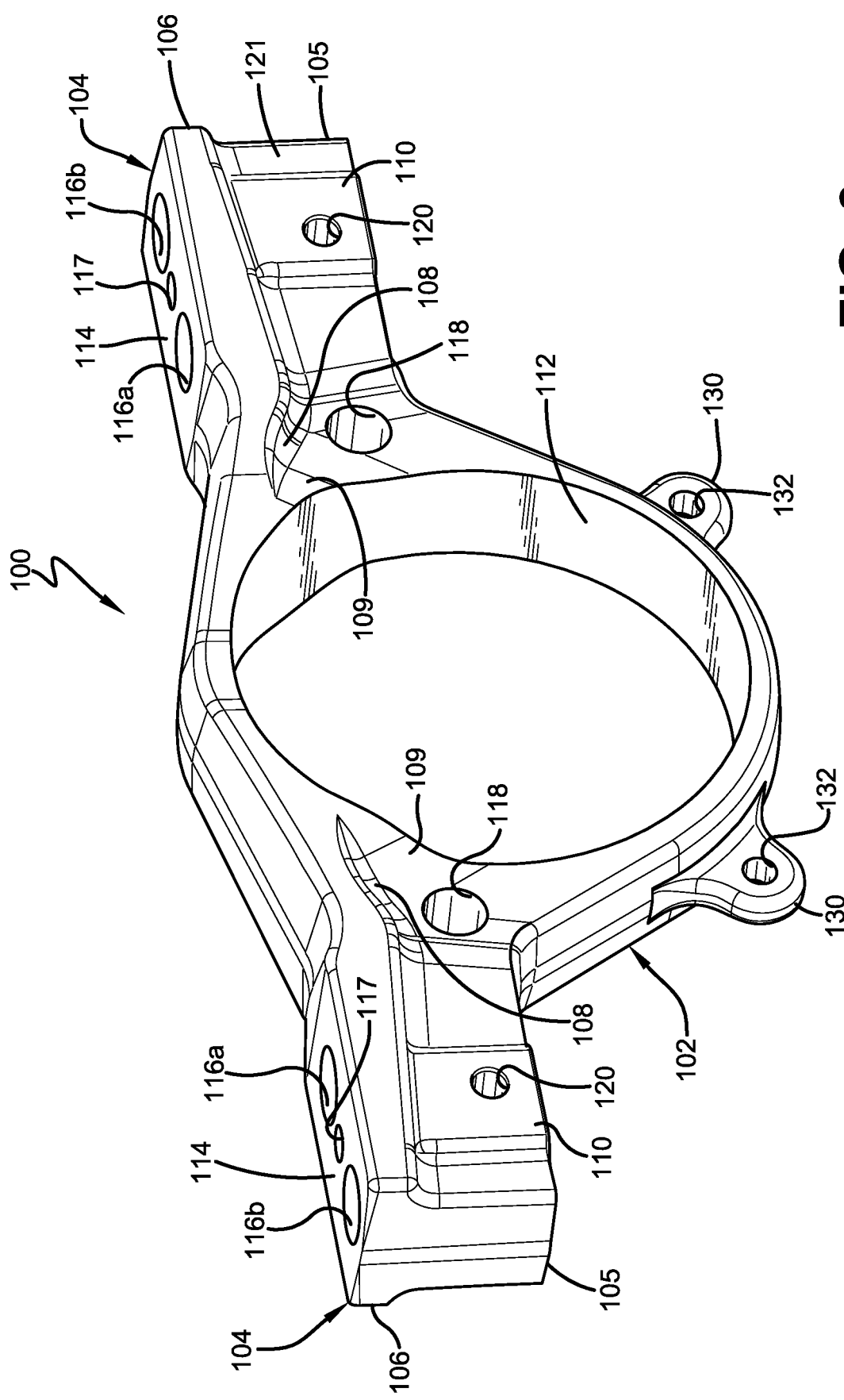
FIG. 3 is a perspective view of an exemplary embodiment torque plate, according to the present invention.

In order to better understand the improved radial mounting torque plate for heavy-duty vehicles of the present invention and the environment in which it operates, a prior art torque plate 14 (FIGS. 1-2) for heavy-duty vehicles is shown incorporated into a pair of brake assemblies 15 (FIG. 2) (only one shown) mounted on components of an axle/suspension system 5.

Axle/suspension system 5 includes an axle 10 and a pair of beams 12. Axle 10 includes a central tube 11 and a pair of axle spindles 13 fixedly attached to opposite ends of the central tube by any suitable means, such as welds. Each one of the pair of beams 12 is spaced apart along and rigidly attached to the central tube 11 by any suitable method, such as welding.

Each brake assembly 15 includes a rotor 16 removably attached to a wheel hub (not shown) of a wheel end assembly (not shown) of the heavy-duty vehicle (not shown), as is known. The wheel end assembly, in turn, is rotatably mounted on a respective spindle 13 of axle 10. Spindles 13 allow the respective wheel end assemblies, and thus the respective rotors 16, to rotate about a centerline C of the spindle.

Each brake assembly 15 also includes prior art torque plate 14 mounted about and rigidly attached to central tube 11 of axle 10 and outboardly-spaced a distance from a respective one of beams 12. In particular, prior art torque plate 14 includes an outboard surface 21, an inboard surface 22 parallel to the outboard surface, and a peripheral edge 23 extending between the outboard and inboard surfaces. A bore 24 extends continuously through prior art torque plate 14 and is pre-machined perpendicular to outboard surface 21. More particularly, prior art torque plate 14 is disposed about and rigidly attached to central tube 11 such that the central tube is disposed through bore 24 and outboard surface 21 is perpendicular to longitudinal central axis C of the respective axle spindle 13.

Each brake assembly 15 also includes a carrier 17 connected to prior art torque plate 14 and a caliper 20. More specifically, prior art torque plate 14 is typically formed with six openings 19. Carrier 17 is axially mounted to prior art torque plate 14 using a plurality of fasteners 18 (FIG. 2) corresponding to and received by transversely-aligned openings 19 of the torque plate. Caliper 20, in turn, is slidably connected in a known manner to carrier 17 such that the caliper is aligned with and generally partially disposed over rotor 16.

Caliper 20 is formed with one or more bores 28 for receiving a piston or multiple pistons (not shown). Caliper 20 includes a brake chamber or actuator 27 in fluid communication with a compressed air source (not shown) of the heavy-duty vehicle for activating movement of the piston. Caliper 20 also includes an outboard pad seat (not shown) that is disposed opposite the piston, as is known. A pair of brake pads 25 having friction material mounted on a backing plate 29 are seated in carrier 17 on respective opposing sides of rotor 16 such that one of the brake pads is adjacent the piston of caliper 20 and the other brake pad is adjacent the outboard pad seat.

During vehicle travel, when brake assembly 15 is engaged, compressed air flows to actuator 27 causing outboard movement of the piston of caliper 20. The piston forces the friction material of brake pad 25 adjacent the piston outboardly against the inboard surface of rotor 16. Because caliper 20 slidably engages carrier 17, engagement of brake pad 25 adjacent the piston against the inboard surface of rotor 16 forces the caliper to slide inboardly, thereby forcing the friction material of the brake pad adjacent the outboard pad seat against the outboard surface of the rotor. Contact of brake pads 25 against the surfaces of rotor 16 slows and/or stops the heavy-duty vehicle and generates forces, such as torque, that act on carrier 17 and caliper 20. Prior art torque plate 14 resists the torque generated when brake assembly 15 is engaged in order to maintain carrier 17, and thus caliper 20 and brake pads 25, in proper alignment to rotor 16, thereby ensuring efficient braking.

Prior art torque plate 14, while adequate for the intended purpose, has certain disadvantages, drawbacks, and limitations. For example, it may become necessary from time to time to service components of brake assembly 15, including carrier 17 and caliper 20. However, due to packaging restrictions of the heavy-duty vehicle, fasteners 18 axially mounting carrier 17 to prior art torque plate 14 are generally difficult to access and manipulate. As a result, installation and/or service of brake assembly 15, and components thereof, is relatively more difficult and takes longer to complete, increasing cost.

Prior art torque plate 14 has been previously modified and adapted for radial, or vertical, mounting, as is known, to facilitate installation and maintenance of brake assembly 15. However, radial mounting versions of prior art torque plate 14 typically require complicated casting structures and/or bulky and non-optimized forged structures. As a result, radial mounting versions of prior art torque plate 14 are relatively heavier than axial mounting torque plates, increasing the cost of materials and manufacturing and reducing the amount of cargo the heavy-duty vehicle can carry.

Thus, there is a need in the art for a radial mounting torque plate that facilitates assembly and maintenance of brake assembly 15 and is weight-neutral or relatively lighter as compared to prior art torque plate 14, reducing the amount of time required for maintenance and assembly and the cost of materials and manufacturing while maintaining or increasing the strength and durability of the torque plate.

An exemplary embodiment radial mounting torque plate 100 (FIG. 3-6) may be incorporated into any suitable brake assembly, such as brake assembly 15, mounted to components of any axle/suspension system, such as axle/suspension system 5, described above.

Torque plate 100 is integrally-formed as a single-piece from any suitable material, such as steel, using any suitable process, such as forging. Torque plate 100 has an outboard side 121 and an inboard side 122 (FIG. 5) and includes a central annular portion 102 and a pair of mounting arms 104. Annular portion 102 includes a central opening 112 formed through torque plate 100 and extending transversely between outboard and inboard sides 121, 122, respectively. Opening 112 engages central tube 11 (FIGS. 1-2) of axle 10. More specifically, opening 112 includes an inner diameter or dimension that provides a clearance or slip fit between torque plate 100 and central tube 11, as is known. The inner dimension of opening 112 may be preselected or may be determined in relation to an outer dimension of central tube 11 such that it may be suitably sized to engage any size axle 10. More preferably, opening 112 may have an inner dimension suitable for any axle 10 having an outer dimension of central tube 11 in the range of from about 5.00 inches to about 5.75 inches.

Mounting arms 104 of torque plate 100 each extend longitudinally outward in opposite directions from annular portion 102 within the plane of the torque plate. It is contemplated that mounting arms 104 may extend radially outward from annular portion 102 in any suitable direction. More preferably mounting arms 104 extend outwardly from annular portion 102 such that the mounting arms are offset from and located at least partially to one side of a horizontal centerline HC (FIG. 4) of opening 112. Mounting arms 104 each include a base 105 having a width or dimension W1 (FIG. 5) extending between the outboard and inboard sides 121, 122, respectively. Dimension W1 may be in the range from about 1.2 inches to about 1.8 inches, and more preferably in the range from about 1.3 inches to about 1.6 inches. Bases 105 may also be tapered, such that dimension W1 may progressively reduce from the end of mounting arms 104 toward annular portion 102. Thus, at least a portion of each base 105 adjacent annular portion 102 and/or at least a part of the annular portion may have a width or dimension W2 that is less than dimension W1. More specifically, each base 105 and annular portion 102 form a generally triangular transition structure TS (FIG. 4) that distributes the forces acting on the mounting arms during operation, increasing the strength and durability of torque plate 100.

Figure 4:
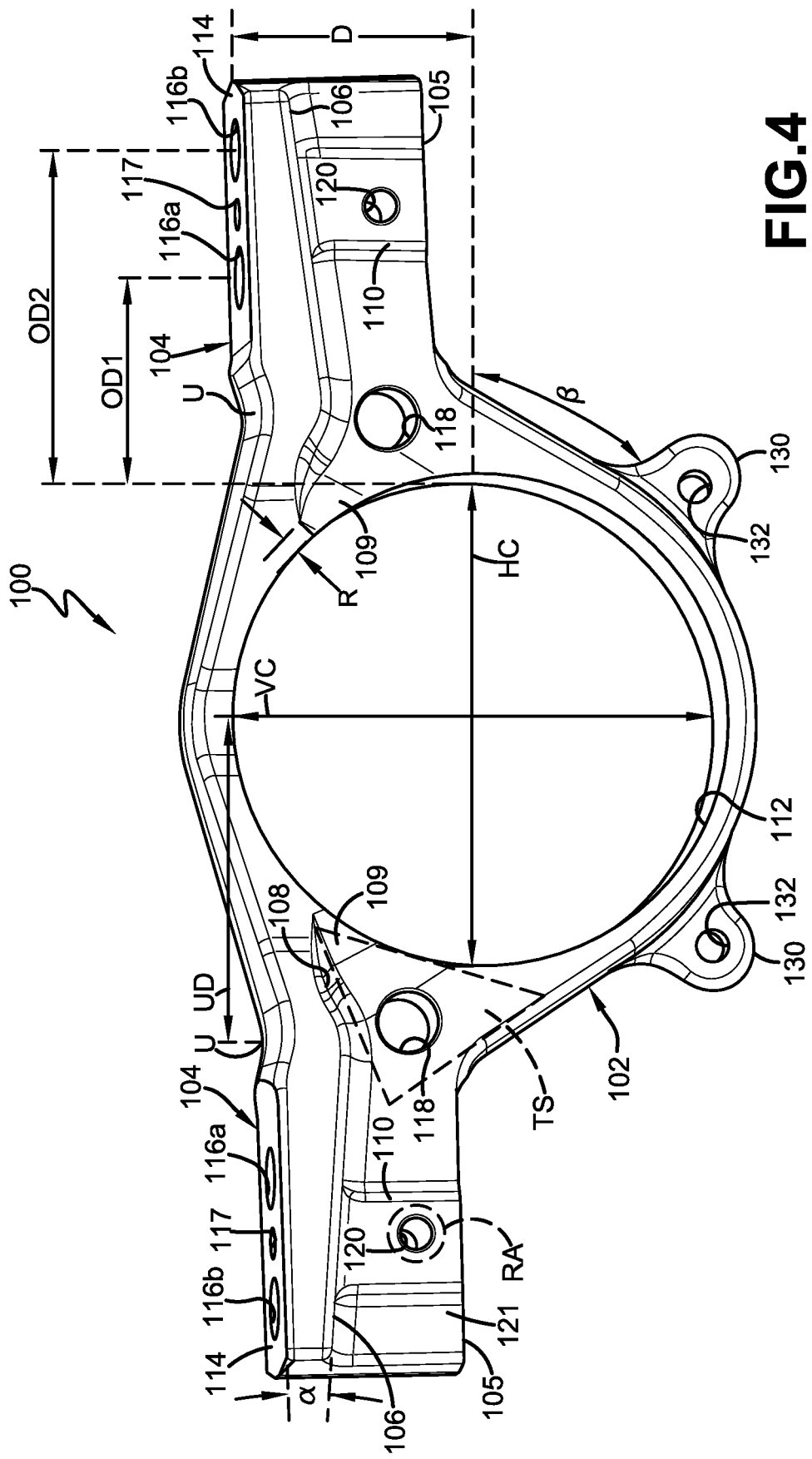
FIG. 4 is a side or transverse elevational view of the exemplary embodiment torque plate shown in FIG. 3.

In accordance with an important aspect of the present invention, each of mounting arms 104 includes a relief radius U (FIG. 4). Each relief radius U is formed adjacent a mounting surface 114 and curves into mounting arms 104 to relieve stress from forces acting on the mounting arms during operation and provide a transition between the mounting arms and annular portion 102. Each relief radius U may be in a range of from about 0.7 inches to about 1.5 inches, and more preferably from about 1.0 inch to about 1.3 inches. Each relief radius U is centered along the respective mounting arm 104 at least slightly inboard of outboard side 121 of the respective mounting arm and at a distance UD from vertical centerline VC (FIG. 4). Distance UD may be in a range of from about 3.25 inches to about 4.00 inches, more preferably from about 3.5 inches to about 3.8 inches, from vertical centerline VC.

Figure 5:
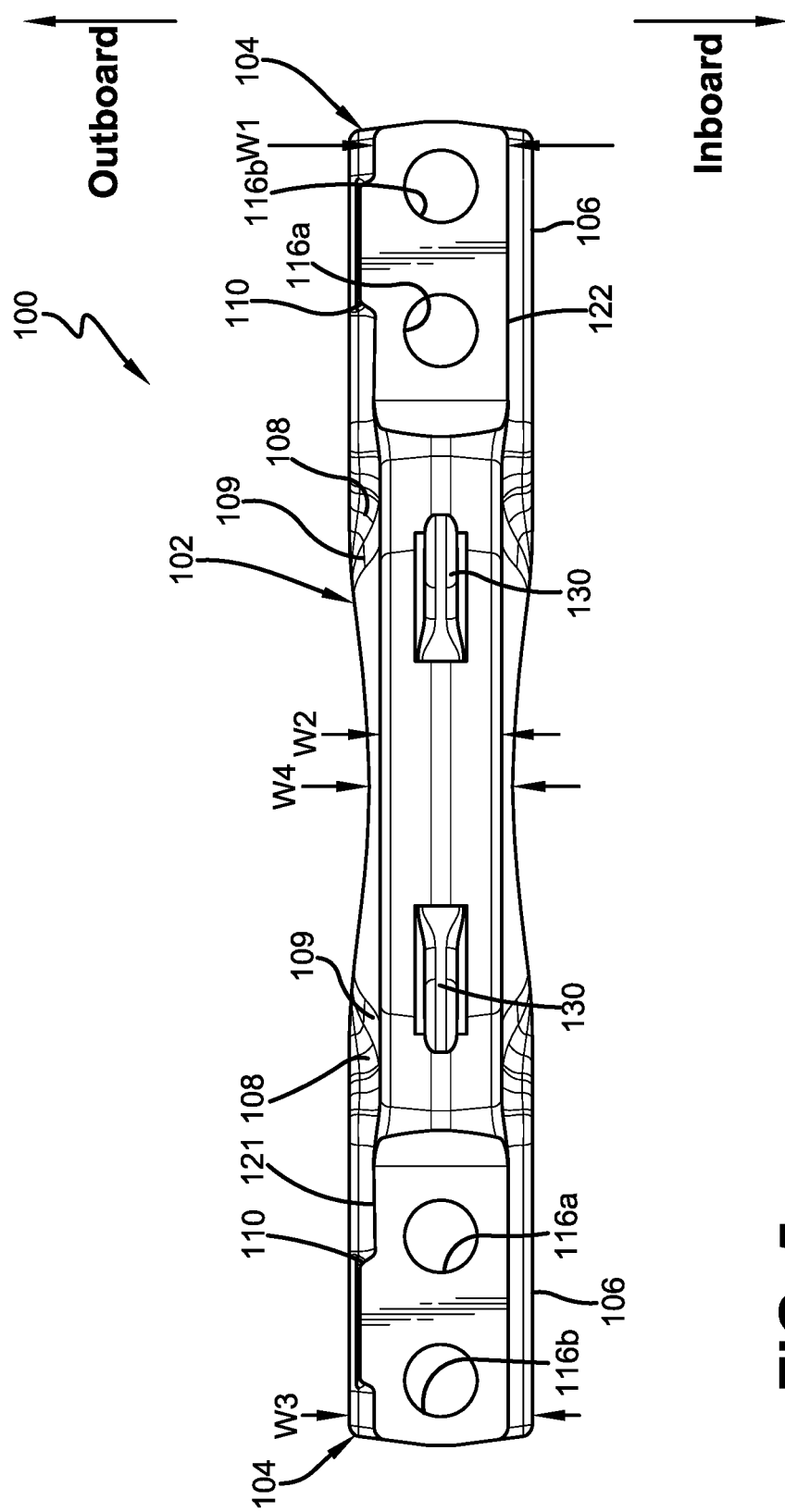
FIG. 5 is a bottom view of the exemplary embodiment torque plate shown in FIGS. 3-4.
Figure 6:
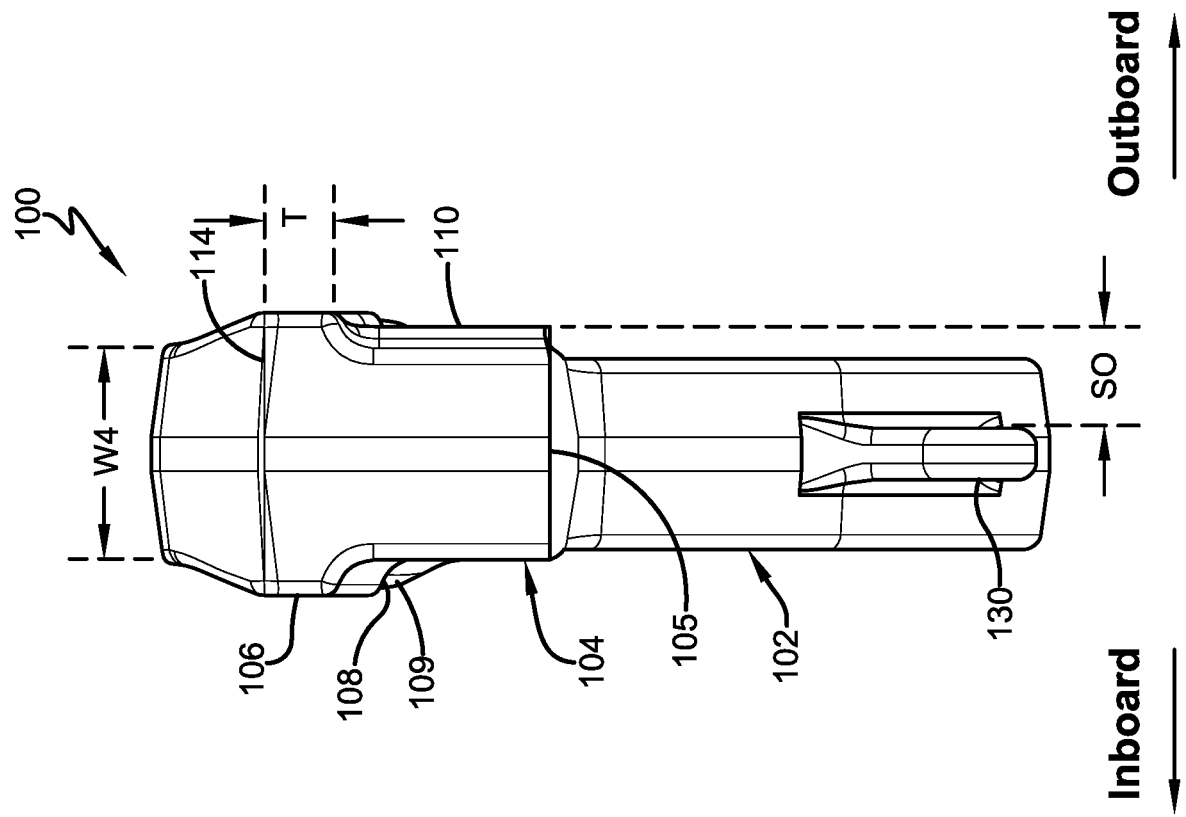
FIG. 6 is an end or longitudinal elevational view of the exemplary embodiment torque plate shown in FIGS. 3-5.

In accordance with another important aspect of the present invention, each of mounting arms 104 is formed with a transversely extending flange 106. More specifically, flanges 106 each extend outboardly and inboardly outward from outboard and inboard sides 121, 122, respectively, of bases 105 such that the mounting arms 104 have a generally T-shaped cross-section as best shown in FIG. 6. Flanges 106 project a variable distance outboardly and inboardly of outboard and inboard sides 121, 122, respectively, such that the flanges have a variable width or dimension. More particularly, flanges 106 have a width or dimension W3 adjacent the end of mounting arms 104 that is greater than dimensions W1, W2 of bases 105 (FIG. 5). Dimension W3 may be in the range of about 1.80 inches to about 2.30 inches, more preferably from about 2.00 inches to about 2.10 inches. Flanges 106 may be tapered along at least a portion of mounting arms 104 adjacent annular portion 102 such that the flanges integrate with and/or form the top of the annular portion having at its narrowest point a width or dimension W4. Dimension W4 may be less than or equal to dimension W3 and greater than dimensions W1, W2 of bases 105. It is also contemplated that dimension W4 may be greater than dimensions W1, W2, W3. Dimension W4 may be in the range of from about 1.40 inches to about 2.30 inches, but more preferably from about 1.53 inches to about 1.77 inches. Thus, flanges 106 are relatively wider than bases 105. As a result, the T-shaped cross-section of torque plate 100 formed by flanges 106 and bases 105 provides mounting arms 104 with increased resistance to stress bending during heavy-duty vehicle operation while reducing the amount of material needed to form the bases of the mounting arms, thereby increasing the strength and durability while reducing the weight of the torque plate.

Flanges 106 may also be formed with a thickness T (FIG. 6). Thickness T may be in the range of from about 0.3 inches to about 1.1 inches, more preferably from about 0.5 inches to about 0.9 inches. Thickness T may vary longitudinally along mounting arms 104 such that the thickness tapers, forming an angle α (FIG. 4), having the narrowest section farthest from vertical centerline VC of opening 112. Angle α may be in the range of from about 4.5 degrees to about 6.5 degrees, more preferably from about 5.0 degrees to about 6.0 degrees. More specifically, thickness T at any point along flanges 106 may be chosen to correspond with the bending stress experienced during operation such that the flanges may be thicker in areas of greater bending stress. Thus, the variability of thickness T provides mounting arms 104 with increased support and resistance to bending stress, thereby maintaining or increasing the strength and durability of torque plate 100 while reducing the amount of material required to form the torque plate, thereby reducing the weight and cost of materials.

In accordance with yet another important aspect of the present invention, each of bases 105 of mounting arms 104 includes a pair of reinforcement ribs 108. Each rib 108 is formed into the outboard and inboard sides 121, 122 of bases 105 adjacent respective flanges 106 using any suitable process such that the ribs generally follow the profile of the flanges determined by thickness T. More specifically, each pair of ribs 108 extend along bases 105 from a location adjacent annular portion 102 and longitudinally outward to a location adjacent relief radius U where thickness T of the respective flanges 106 is greatest. Ribs 108 provide a transition from flanges 106 to outboard and inboard sides 121, 122, respectively, of bases 105, increasing the stiffness and rigidity of the bases, and thus mounting arms 104, thereby maintaining or increasing the strength and durability of torque plate 100.

In accordance with yet another important aspect of the present invention, each of mounting arms 104 includes a pair of blending/tapering structures or ramps 109. In particular, ramps 109 provide outboard and inboard sides 121, 122, respectively, of torque plate 100 with smooth transitional areas between bases 105, flanges 106, ribs 108, and annular portion 102 adjacent opening 112. Ramps 109 form outboardly and inboardly progressive extensions from the outboard and inboard sides 121, 122, respectively, of bases 105 of mounting arms 104 allowing the bases to integrate with the top of annular portion 102. More particularly, ramps 109 extend longitudinally along at least a portion of bases 105 and annular portion 102 adjacent opening 112, extending progressively more outboardly and inboardly from outboard and inboard sides 121, 122, respectively, and merging with the top of the annular portion. Ramps 109 blend with respective ribs 108 at a radial distance R (FIG. 4) outward from opening 112 in order to prevent a weld (not shown) laid between the opening and axle 10 (FIG. 2) from undercutting rib 108. Radial distance R may be in the range of from about 0.25 inches to 0.38 inches from opening 112. The smooth transition provided by ramps 109 allows for the utilization of auto-welding equipment to attach torque plate 100 to axle 10, facilitating installation. In addition, the smooth transition provided by ramps 109 enables a more robust weld to be formed between torque plate 100 and axle 10 with reduced stress, thereby maintaining or increasing the strength and durability of the torque plate and ensuring alignment of the components of brake assembly 15.

Each of mounting arms 104 also includes integrally-formed mounting surface 114. Mounting surfaces 114 are generally flat or planar surfaces extending transversely and longitudinally along at least a portion of flanges 106 and bridging the flanges. The relatively greater dimensions W3, W4 of flanges 106 as compared to dimensions W1, W2 of mounting arms 104 enable mounting surfaces 114 to be relatively wider, facilitating radial mounting of carrier 17 to torque plate 100. More specifically, each mounting surface 114 is formed with a longitudinally inner opening 116a and a longitudinally outer opening 116b extending perpendicularly through the respective mounting surfaces and mounting arms 104. Each of openings 116a, b may be in a longitudinally-spaced parallel arrangement along the respective mounting surface 114 such that the openings may be transversely centered along the mounting arms. Openings 116a, b may be in a longitudinally-spaced arrangement that provides sufficient distance between each of the openings such that a standard-sized impact socket does not interfere with or contact adjacent components of brake assembly 15 or interfere with the longitudinally adjacent opening during maintenance and assembly. It is also contemplated that each of mounting surfaces 114 may be formed with any suitable number of openings 116a, b arranged in any manner, such as transversely staggered, that may be suitable for drive axles. Each of openings 116a, b receive a respective one of fasteners 18 (FIG. 2) to rigidly secure carrier 17 to torque plate 100 and maintain caliper 20, brake pads 25, and/or other brake system components square to rotor 16.

With particular reference to FIG. 4, and in accordance with an important aspect of the present invention, openings 116a, b may be located relative to opening 112 of annular portion 102 in order to optimize the weight of torque plate 100. In particular, openings 116a may be located proximate to opening 112 such that a standard-size socket may fully engage fasteners 18. Openings 116b may be located relatively farther than openings 116a from opening 112 but sufficiently proximate to allow mounting arms 104 to be longitudinally compact in order to react forces experienced during operation and reduce the weight of torque plate 100. More particularly, openings 116a may be located an offset distance OD1 from the end of horizontal centerline HC intersecting opening 112. Offset distance OD1 may be in the range of from about 5.0 inches to about 5.5 inches, more preferably from about 5.2 inches to about 5.3 inches. Openings 116b may be located an offset distance OD2 from the end of horizontal centerline HC and greater than offset distance OD1. Offset distance OD2 may be in the range of from about 6.3 inches to about 7.3 inches, more preferably from about 6.7 inches to about 7.0 inches. Spacing openings 116a, b relative to opening 112 in this manner allows torque plate 100 to be relatively more compact as compared to prior art radial mounting torque plates, reducing weight and cost of materials and manufacturing while facilitating maintenance and repair of brake assembly 15 by increasing the accessibility of fasteners 18.

Mounting surfaces 114 may also each be formed with an opening 117 extending perpendicularly and partially through the respective mounting arm 104. Each opening 117 may be arranged longitudinally-parallel to and between each pair of openings 116a, b in mounting surfaces 114. A peg or dowel (not shown) made from any suitable material may be disposed within one or both of openings 117. Each dowel may be secured within the respective opening 117 using any suitable means, but is preferably press fit into the respective opening, and extends at least partially radially outward from the respective opening. The dowels may be received in a slip fit manner in respective corresponding openings (not shown) formed in carrier 17. More preferably, a dowel may be press fit into a respective opening 117 in mounting surface 114 of one mounting arm 104 and received in a slip fit manner in the corresponding opening on carrier 17. Another dowel may be press fit into another opening on carrier 17 and received in a slip fit manner in the corresponding opening 117 in mounting surface 114 of the other mounting arm 104. As a result, openings 117 and the corresponding dowels allow for relatively easier assembly and alignment of brake assembly 15 and maintain the spatial relationship between carrier 17 and rotor 16. It is contemplated that one of openings 117 or corresponding openings in carrier 17 may be elongated to form a slot that provides flexibility for variation in positional accuracy of the openings during manufacturing. It is also contemplated that a shoulder bolt may be disposed through one of openings 116a, b in a tight slip fit manner in order to accurately position carrier 17 on torque plate 100.

In accordance with an important aspect of the present invention, mounting surfaces 114 include structural optimization allowing the torque plate to be utilized with different sizes of rotor 16. In particular, each of mounting surfaces 114 are offset a distance D (FIG. 4) from horizontal centerline HC of opening 112. Distance D may be in the range of from about 2.0 inches to about 3.2 inches, more preferably from about 2.2 inches to about 2.6 inches. More particularly, distance D between mounting surfaces 114 and horizontal centerline HC of opening 112 allows sufficient clearance between torque plate 100 and the smallest-sized rotor 16, such as about 415 mm, with the lowest positioned carrier 17. Distance D also allows torque plate 100 to be utilized with integrated carriers, carrier-free calipers, or a larger rotor 16, such as about 430 to 434 mm, with the highest positioned carrier 17. Thus, distance D of mounting surfaces 114 provides flexibility for the same torque plate 100 to be utilized and packaged with different sizes of carrier 17 corresponding to different sizes of rotor 16.

Torque plate 100 may be formed with at least a pair of upper mounting bosses 110 for mounting a dust shield (not shown). Each of upper mounting bosses 110 form flat or planar projections extending outboardly from outboard side 121 of respective mounting arms 104. Upper mounting bosses 110 each project outboardly such that the upper mounting bosses may be coplanar with the outboard edge of the respective flange 106. More preferably, upper mounting bosses 110 project outboardly from outboard side 121 such that the upper mounting bosses are recessed from the edge of the respective flange 106. Upper mounting bosses 110 may be formed adjacent and/or occupy a portion of rib 108 of the respective mounting arm 104. Upper mounting bosses 110 are each formed with a respective opening 120 for receiving respective fasteners (not shown) to secure the dust shield to torque plate 100. Each of openings 120 is located on the respective upper mounting boss 110 such that the opening is between the respective openings 116a, b to prevent interference with the openings formed through mounting surface 114 and into the mounting arms. Upper mounting bosses 110 each provide a surface surrounding respective openings 120 that offsets the dust shield from torque plate 100. More specifically, upper mounting bosses 110 may be formed with a radial support area RA (FIG. 4) that extends a radial distance at least about 0.2 inches from opening 120 to provide a large contact interface between the dust shield and torque plate 100. As a result, upper mounting bosses 110 provide the dust shield with increased stiffness and vibration resistance and allow a standard impact socket to engage fasteners 18 without requiring removal of or interference with the dust shield.

Torque plate 100 may also be formed with at least a pair of lower mounting bosses 130. Lower mounting bosses 130 extend radially outward from annular portion 102 in a circumferentially-spaced arrangement. More specifically, lower mounting bosses 130 extend from annular portion 102 such that each of the lower mounting bosses is circumferentially-spaced an angle β (FIG. 4) from the horizontal centerline HC. Angle β may be any suitable angle and may be in the range of from about 30 degrees to about 60 degrees, and more preferably from about 42 degrees to about 48 degrees. Lower mounting bosses 130 are centered transversely on annular portion 102 such that the lower mounting bosses are spaced a transverse offset distance SO from upper mounting bosses 110. Offset distance SO may be in the range of from about 0.25 inches to about 1.1 inches, more preferably from about 0.35 inches to about 0.85 inches. Each lower mounting boss 130 is formed with a respective opening 132 for receiving a respective fastener (not shown) to secure the dust shield to torque plate 100.

Torque plate 100 may also include a pair of sensor mounting openings 118, such as for anti-lock braking (ABS). Each sensor mounting opening 118 may be formed through a respective one of transition structures TS such that the transition structure isolates stress risers potentially caused by the sensor mounting openings, increasing the strength and durability of torque plate 100. It is also contemplated that sensor mounting openings 118 may be formed through a portion of the respective mounting arm 104 and/or ramp 109. By incorporating two sensor mounting openings 118, torque plate 100 enables alternate positions for different ABS sensor mounting arrangements and/or facilitates installation of multiple sensors mounted directly to the torque plate. For instance, one sensor mounting opening 118 may receive an ABS sensor (not shown) while the other sensor mounting opening may receive a reverse/backup sensor (not shown). Mounting openings 118 also reduce the cost and amount of materials and manufacturing associated with additional components, such as ABS sensor mounting brackets and the like.

Figure 7:
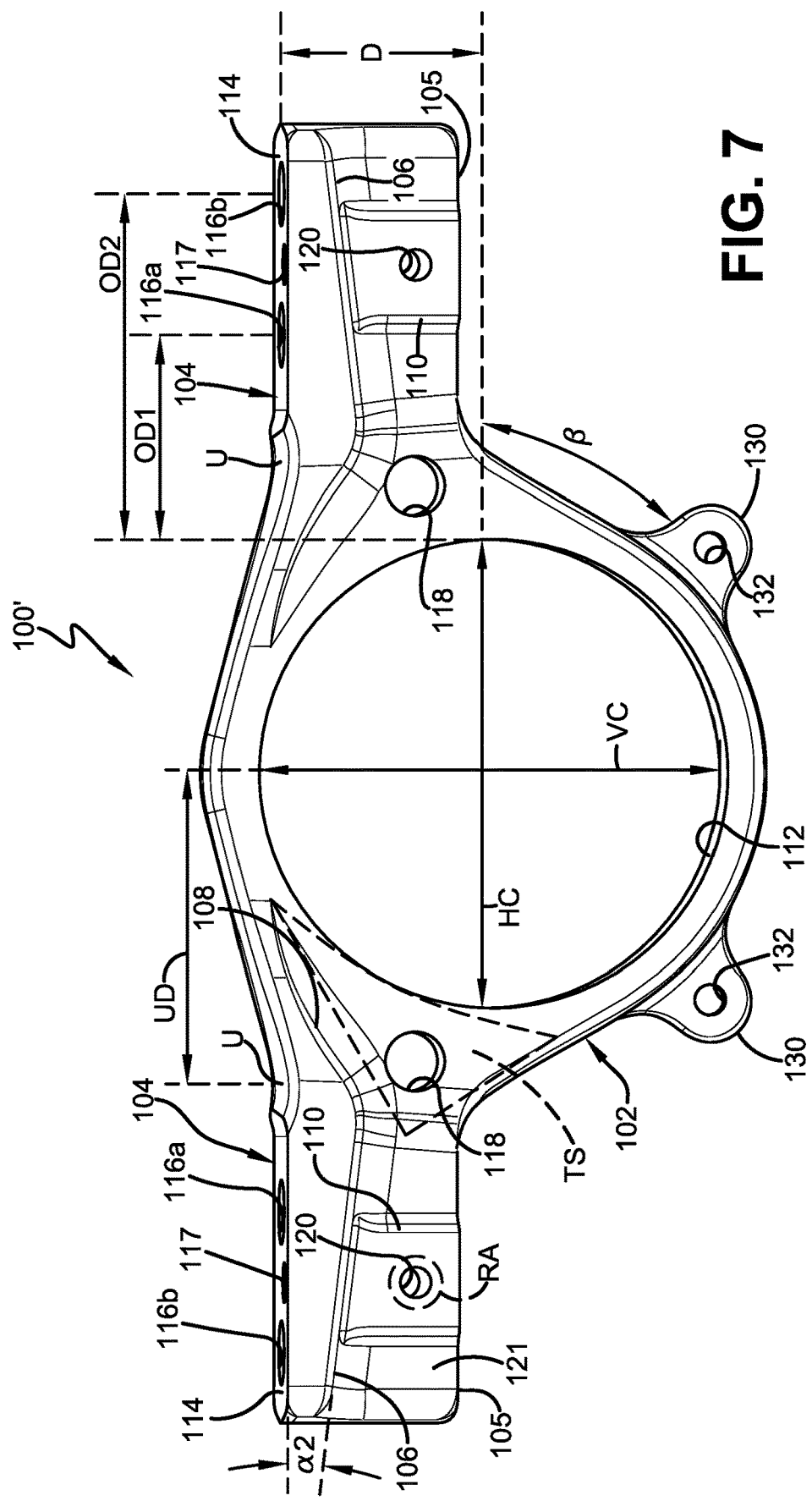
FIG. 7 is a side or transverse elevational view of an alternative configuration of the exemplary embodiment torque plate, showing the torque plate formed without ramps.
Figure 8:
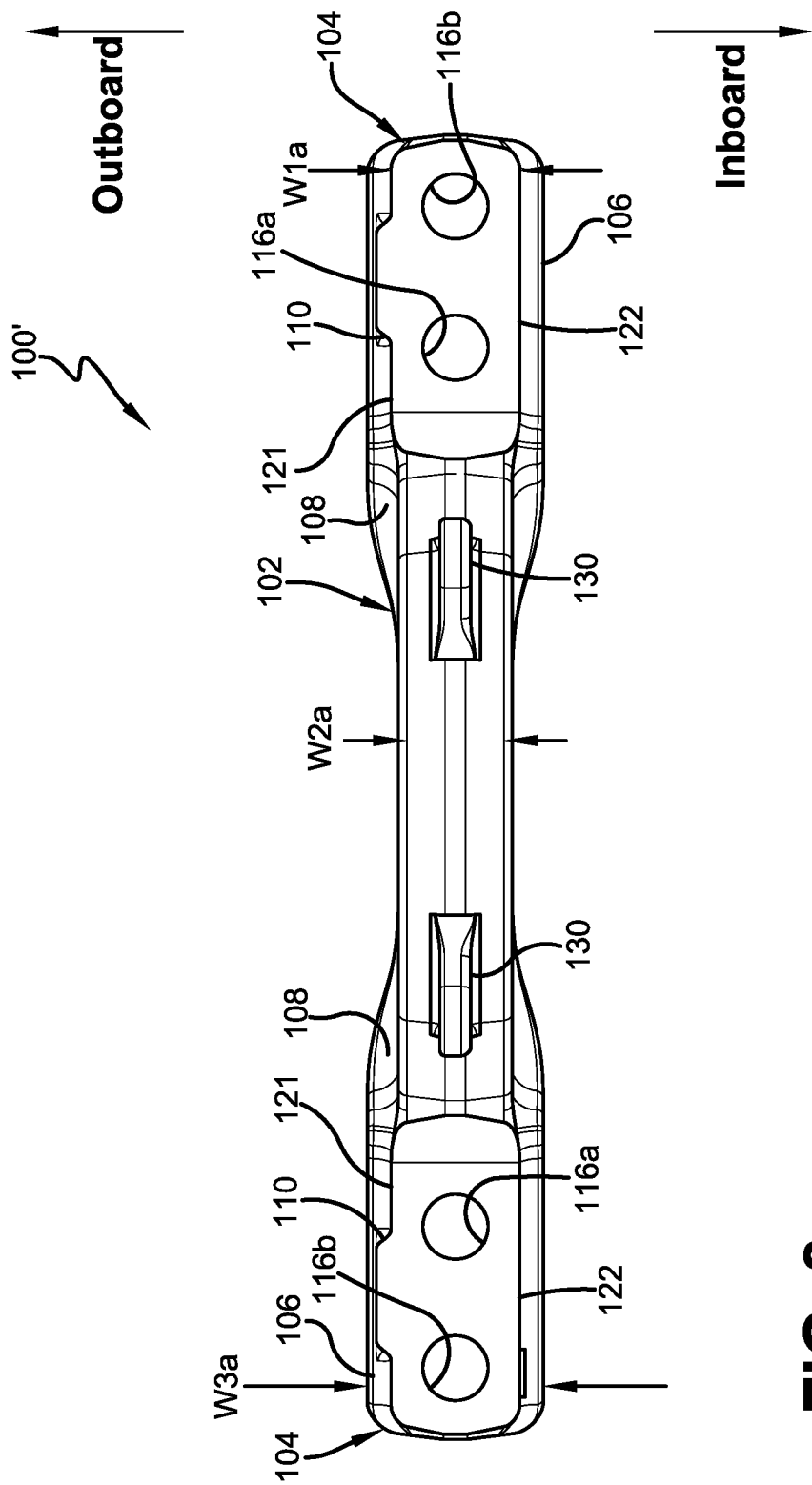
FIG. 8 is a bottom view of the alternative configuration of the exemplary embodiment torque plate shown in FIG. 7.
Figure 9:
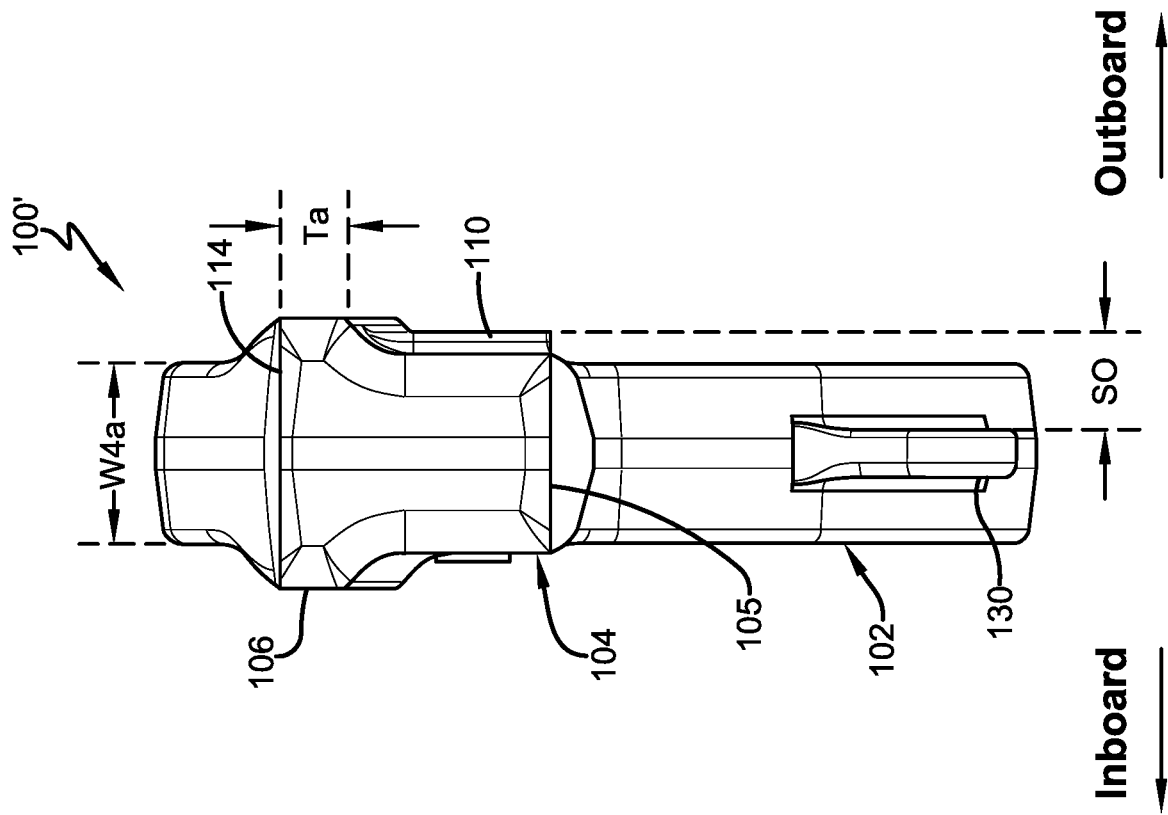
FIG. 9 is an end or longitudinal elevational view of the alternative configuration of the exemplary embodiment torque plate shown in FIGS. 7-8.

With particular reference to FIGS. 7-9, it is contemplated that an alternative embodiment radial mounting torque plate 100' may utilize mounting arms 104 formed without ramps 109. In such a configuration, bases 105 of mounting arms 104 may have a width or dimension W1a (FIG. 8) in the range from about 1.2 inches to about 1.8 inches, and more preferably in the range from about 1.3 inches to about 1.6 inches. Bases 105 and/or annular portion 102 may also have a width or dimension W2a that is less than or equal to dimension W1a. Dimension W2a may be in the range of from about 1.0 to about 1.8, and more preferably from about 1.1 to about 1.6. In the alternative configuration, flanges 106 of mounting arms 104 may have a width or dimension W3a adjacent the end of mounting arms 104 that is greater than dimensions W1a, W2a of bases 105 and/or annular portion 102. Dimension W3a may be in the range of about 1.8 inches to about 2.3 inches, and more preferably from about 2.0 inches to about 2.1 inches. Flanges 106 may taper longitudinally along mounting arms 104 such that a portion of the flanges adjacent annular portion 102 may have a width or dimension equal to a width or dimension W4a at the narrowest point of annular portion 102. Dimension W4a is less than dimension W3a of mounting arms 104 and generally equal to dimension W2a of annular portion 102. In addition, in the alternative configuration, flanges 106 may also be formed with a thickness Ta (FIG. 9) in the range of from about 0.3 inches to about 1.1 inches, and more preferably from about 0.5 inches to about 0.9 inches. Thickness Ta may vary longitudinally along mounting arms 104 such that the thickness tapers, forming an angle $\alpha 2$ (FIG. 7). Angle $\alpha 2$ may be in the range of from about 5.8 degrees to about 7.8 degrees, and more preferably from about 6.3 degrees to about 7.3 degrees.

Figure 10:
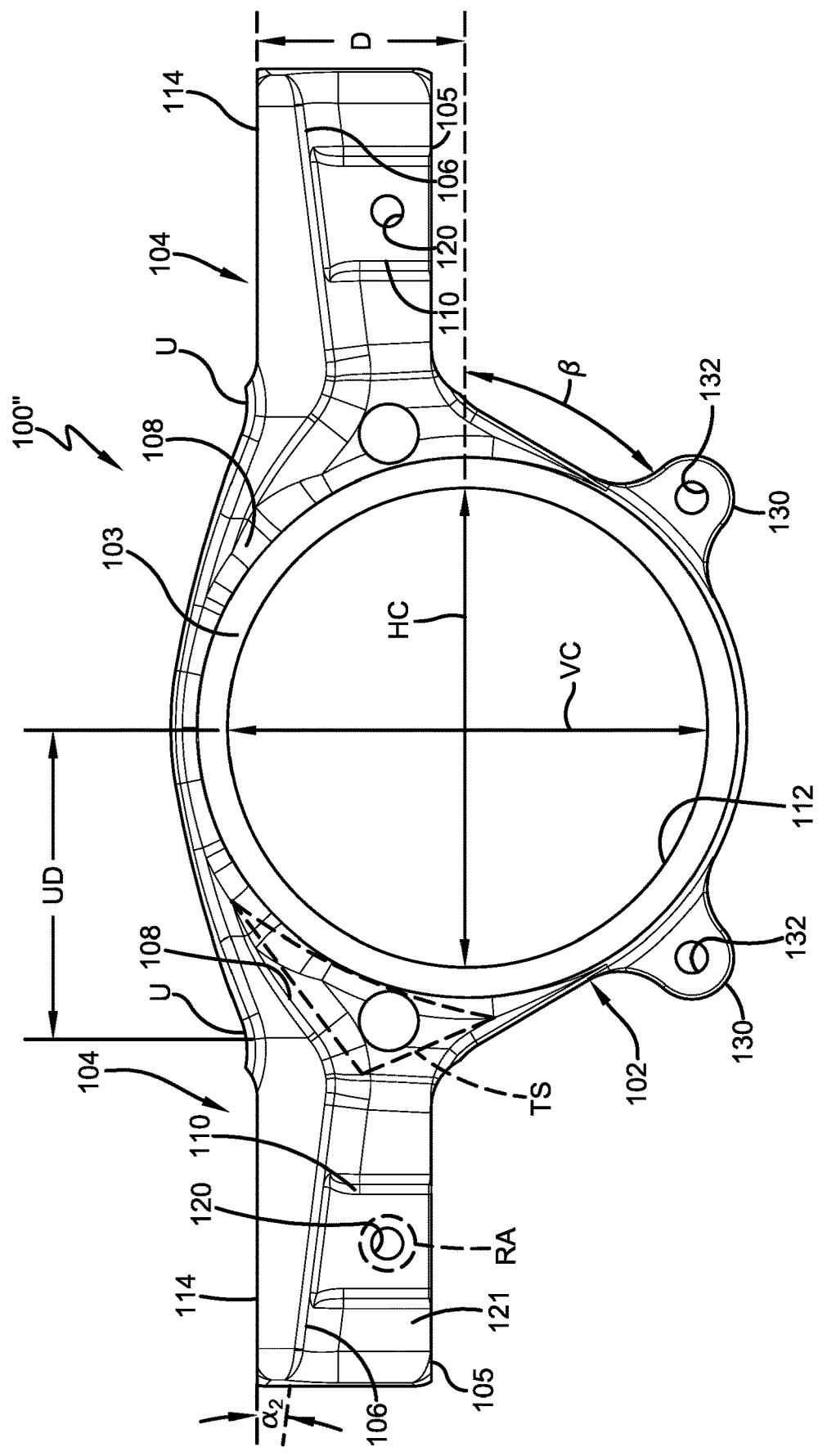
FIG. 10 is a side or transverse elevational view of another alternative configuration of the exemplary embodiment torque plate, showing the torque plate formed without ramps.
Figure 11:
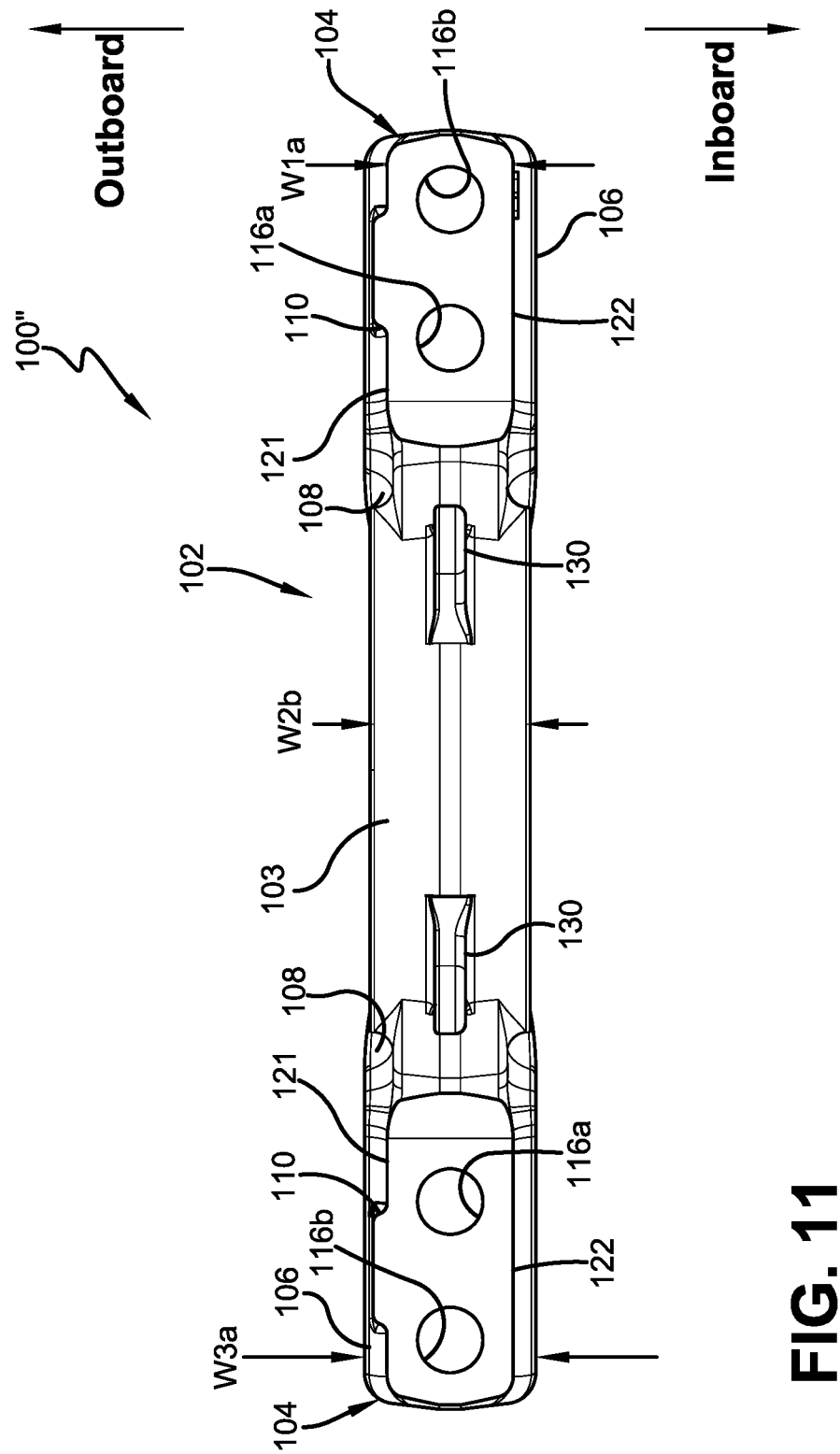
FIG. 11 is a bottom view of the alternative configuration of the exemplary embodiment torque plate shown in FIG. 10.
Figure 12:
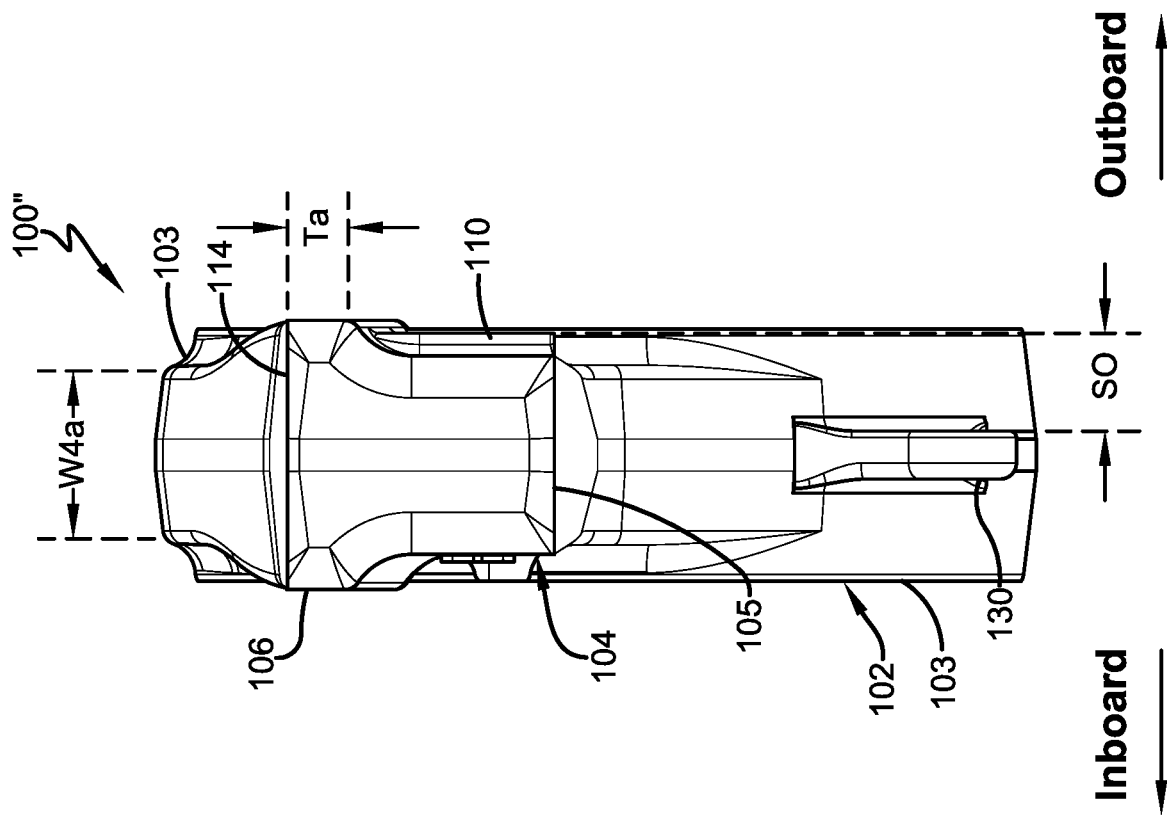
FIG. 12 is an end or longitudinal elevational view of the alternative configuration of the exemplary embodiment torque plate shown in FIGS. 10-11.

With particular reference to FIGS. 10-12, it is also contemplated that an alternative embodiment radial mounting torque plate 100" may include a circumferential projection, flange, or lip 103 extending axially inboardly and outboardly from annular portion 102. Lip 103 may project inboardly and outboardly from annular portion 102, extending beyond dimension W4a in the range of from about 0.06 inches to about 0.40 inches, more preferably from about 0.10 inches to about 0.30 inches. As a result, at least a part of annular portion 102 may have a width or dimension W2b that is greater than dimension W4a. Dimension W2b may also be less than or equal to dimension W3a. Lip 103 provides additional structure about axle 10 to which weldments may be attached, thereby increasing the strength and durability of the welds.

Thus, torque plates 100, 100', 100" according to the present invention, facilitate assembly, maintenance, and repair of disc brake assembly 15 by providing openings 116a, b allowing access to fasteners 18 for radial or vertical mounting of carrier 17 regardless of the packaging restrictions of the heavy-duty vehicle. In addition, torque plates 100, 100', 100" allows for relatively easier assembly and alignment of brake assembly 15 while maintaining the spatial relationship between carrier 17 and rotor 16 by providing openings 117 and corresponding dowels. Moreover, flanges 106 and ribs 108 provide resistance to bending stress and increase stiffness of torque plate 100, increasing or maintaining the strength and durability of the torque plate while maintaining or reducing the weight and reducing the cost of materials and manufacturing compared to prior art torque plates.

In addition, ramps 109 provide a smooth transition between bodies 105 and flanges 106 of mounting arms 104, allowing for the use of automated welding while enabling a more robust weld to be formed between torque plate 100 and axle 10 with reduced stress, thereby facilitating installation while maintaining or increasing the strength and durability of the torque plate and ensuring alignment of the components of brake assembly 15. Offset distance D of mounting surfaces 114 provides clearance between torque plate 100 and the smallest-sized carrier 17, allowing the torque plate to be utilized and packaged with different sizes of the carrier corresponding to different sizes of rotor 16. Mounting openings 118 allow ABS and/or other types of sensors to be mounted on torque plate 100, reducing the cost and amount of materials and manufacturing associated with additional components, such as ABS sensor mounting brackets and the like. Each pair of openings 116a, b may be arranged in any suitable manner to correspond to any bolt pattern utilized on any type of drive axle.

It is contemplated that torque plate 100, 100', 100" of the present invention could be formed from any suitable material, including but not limited to composites, metal, and the like, without changing the overall concept or operation of the present invention. It is also contemplated that torque plate 100, 100', 100" of the present invention could be utilized in braking systems on heavy-duty vehicles having more than one axle and/or one or more than one wheel per wheel end assembly, without changing the overall concept or operation of the present invention. It is further contemplated that torque plate 100, 100', 100" of the present invention could be utilized with all types of heavy-duty vehicle disc braking systems without changing the overall concept or operation of the present invention.

Accordingly, torque plate 100, 100', 100" of the present invention is simplified; provides an effective, safe, inexpensive, and efficient structure and method, which achieves all the enumerated objectives; provides for eliminating difficulties encountered with prior art torque plates; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries, and principles of the invention; the manner in which the torque plate is used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A radial mounting torque plate for mounting a disk brake component for heavy-duty vehicles, said torque plate comprising:
   an annular portion formed with an opening for receiving an axle of said heavy-duty vehicle; and
   a pair of mounting arms for radially mounting said disc brake component, said mounting arms being integrally formed with and extending longitudinally outward in opposite directions from said annular portion;
   wherein the mounting arms are formed with a continuous T-shaped cross-section extending from the annular portion to the end of each mounting arm.

2. The radial mounting torque plate of claim 1, said mounting arms and said annular portion forming a triangular transition structure adjacent the annular portion.

3. The radial mounting torque plate of claim 2, said mounting arms further comprising an arm width, said arm width being in the range of from about 1.2 inches to about 1.8 inches.

4. The radial mounting torque plate of claim 3, said mounting arms further comprising an arm width, said arm width being in the range of from about 1.3 inches to about 1.6 inches.

5. The radial mounting torque plate of claim 3, said mounting arms further comprising an inboard flange and an outboard flange extending transversely outward from the mounting arm to form said T-shaped cross-section.

6. The radial mounting torque plate of claim 5, said mounting arms further comprising inboard and outboard stiffening ribs formed into the mounting arms adjacent said inboard and outboard flanges.

7. The radial mounting torque plate of claim 5, said inboard and outboard flanges being tapered such that the inboard and outboard flanges have a first flange width and a second flange width, said first and second flange width extending from an outboard edge of said outboard flange to an inboard edge of said inboard flange;
  wherein the first flange width is located adjacent a longitudinal end of said mounting arms and the second flange width is located at least one of adjacent said annular portion and on the annular portion; and
  wherein said first flange width is greater than said arm width and said second flange width.

8. The radial mounting torque plate of claim 7, said first flange width being in the range of from about 1.8 inches to about 2.30 inches; and
  said second flange width being in the range of from about 1.40 inches to about 2.30 inches.

9. The radial mounting torque plate of claim 8, said first flange width being in the range of from about 2.00 inches to about 2.10 inches; and
  said second flange width being in the range of from about 1.53 inches to about 1.77 inches.

10. The radial mounting torque plate of claim 7, said inboard and outboard flanges further comprising a thickness, said thickness being variable as the inboard and outboard flanges extend longitudinally along said mounting arms.

11. The radial mounting torque plate of claim 10, said thickness being in the range of from about 0.3 inches to about 1.1 inches.

12. The radial mounting torque plate of claim 11, said thickness being in the range of from about 0.5 inches to about 0.9 inches.

13. The radial mounting torque plate of claim 10, each of said mounting arms further comprising a planar mounting surface formed by and extending across said inboard and outboard flanges, said mounting surface being perpendicular to a plane of said radial mounting torque plate.

14. The radial mounting torque plate of claim 13, said mounting surfaces being offset from a horizontal center line of said annular portion a distance in the range of from about 2.0 inches to about 3.2 inches.

15. The radial mounting torque plate of claim 14, said mounting surfaces being offset from a horizontal center line of said annular portion a distance in the range of from about 2.2 inches to about 2.6 inches.

16. The radial mounting torque plate of claim 13, each of said mounting surfaces further comprising at least one component opening formed through the mounting surface and said mounting arm for receiving a fastener to removably attach a disk brake component.

17. The radial mounting torque plate of claim 16, each of said mounting arms further comprising a relief radius formed into the mounting arm adjacent said mounting surface, said relief radius being in the range of from about 0.7 inches to about 1.5 inches.

18. The radial mounting torque plate of claim 17, said relief radii being in the range of from about 1.0 inches to about 1.3 inches.

19. The radial mounting torque plate of claim 17, said relief radii being centered a distance in the range of from about 3.25 inches to about 4.00 inches from a vertical center line of said annular portion.

20. The radial mounting torque plate of claim 19, said relief radii being centered a distance of from about 3.5 inches to about 3.8 inches from said vertical center line.

21. The radial mounting torque plate of claim 19, each of said mounting arms further comprising an inboard ramp and an outboard ramp formed adjacent said inboard and outboard flanges and said relief radius, said ramps extending from the mounting arms onto said annular portion.

22. The radial mounting torque plate of claim 19, each of said mounting arms being formed with an opening for receiving a sensor, said opening being formed transversely through the mounting arm adjacent said inboard and outboard flanges and said annular portion.

23. The radial mounting torque plate of claim 22, each of said mounting arms further comprising a boss extending outboardly of an outboard surface of the mounting arm, said boss being located longitudinally along said mounting arm between said at least one component opening; and
  a boss opening formed through said boss and said mounting arm for receiving a fastener for mounting a dust shield.

24. The radial mounting torque plate of claim 23, said annular portion further comprising a pair of lower mounting bosses, said lower mounting bosses each having a lower boss opening for receiving fastener for mounting a dust shield.

25. A radial mounting torque plate for mounting a disk brake component for heavy-duty vehicles, said torque plate comprising:
  an annular portion formed with an opening for receiving an axle of said heavy-duty vehicle; and
  a pair of mounting arms, said mounting arms having an inboard flange, an outboard flange, and an arm width, said arm width being in the range of from about 1.2 inches to about 1.8 inches, said mounting arms being integrally formed with and extending longitudinally outward in opposite directions from said annular portion, the mounting arms and the annular portion forming a triangular transition structure adjacent the annular portion, each of the mounting arms further including a planar mounting surface formed by and extending across said inboard and outboard flanges, said mounting surface being perpendicular to a plane of said radial mounting torque plate;
  wherein the mounting arms are formed with a T-shaped cross-section, said inboard and outboard flanges extending transversely outward from the mounting arm to form said T-shaped cross-section;
  wherein said inboard and outboard flanges are tapered such that the inboard and outboard flanges have a first flange width and a second flange width, said first and second flange width extending from an outboard edge of said outboard flange to an inboard edge of said inboard flange, the first flange width being located adjacent a longitudinal end of the mounting arms, the second flange width being located at least one of adjacent the annular portion and on the annular portion, the first flange width being greater than the arm width and the second flange width; and
  wherein the inboard and outboard flanges include a thickness, said thickness being variable as the inboard and outboard flanges extend longitudinally along the mounting arms.

* * * * *